United States Patent
Miyazawa

(10) Patent No.: US 6,897,894 B1
(45) Date of Patent: May 24, 2005

(54) ELECTRONIC CAMERA WITH RECORDED IMAGE SEARCHING FUNCTION

(75) Inventor: Azuma Miyazawa, Hitaka (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/526,116

(22) Filed: Mar. 15, 2000

(30) Foreign Application Priority Data

Mar. 15, 1999 (JP) .......................................... 11-068289

(51) Int. Cl.[7] ............................................. H04N 5/76
(52) U.S. Cl. ............................................... 348/231.8
(58) Field of Search ....................... 348/231.8, 333.05, 348/207.99, 231.08

(56) References Cited

U.S. PATENT DOCUMENTS

| 5,278,673 A | * | 1/1994 | Scapa et al. | ................. 358/473 |
| 5,903,309 A | * | 5/1999 | Anderson | ............... 348/333.05 |
| 5,986,700 A | * | 11/1999 | Wakui | ..................... 348/231.08 |
| 6,233,015 B1 | * | 5/2001 | Miller et al. | ........... 348/333.05 |
| 6,249,316 B1 | * | 6/2001 | Anderson | ............... 348/333.05 |
| 6,445,412 B1 | * | 9/2002 | Shiohara | ................. 348/207.99 |
| 6,515,704 B1 | * | 2/2003 | Sato | ....................... 348/333.05 |
| 6,538,698 B1 | * | 3/2003 | Anderson | ............... 348/333.05 |

* cited by examiner

Primary Examiner—Wendy R. Garber
Assistant Examiner—Rashawn N Tillery
(74) Attorney, Agent, or Firm—Straub & Pokotylo; John C. Pokotylo

(57) ABSTRACT

The time during which the search keys in the operation section instruct search control section continuously to search for image data recorded on recording media is measured. The search range in the recording media is adjusted by a search control section variably based on the time data obtained in the time measuring section and recording capacity of the recording media. The frame-advancing operation for each search is performed for each frame or for every few frames.

14 Claims, 6 Drawing Sheets

ELECTRONIC CAMERA WITH RECORDED IMAGE SEARCHING FUNCTION

CROSS-REFERENCE TO RELATED APPLICATION

This application is based upon and claims the benefit of priority from the prior Japanese Patent Application No. 11-068289, filed Mar. 15, 1999, the entire contents of which are incorporated herein by reference.

BACKGROUND OF THE INVENTION

The present invention relates to an image display device such as an electronic camera that records the pictures of objects one after another as image data on a recording medium such as a memory card.

Recently, a variety of electronic cameras have been developed. Most of them can convert the pictures of objects into image data, write each image data as a frame data in a frame memory and or write the image data into a file memory with character data such as date data added as required, and record the files on a recording medium such as a memory card.

On the other hand, with the recent rapid advances in semiconductor technologies, bulk semiconductor memories have been developed one after another. Consequently, the capacity of recording media used for electronic cameras is increasing year by year. And so is the amount of data, i.e., the number of data items that can be recorded on one recording medium.

If the number of image data items that can be recorded on one recording medium increases to such an extent as to eliminate the need to carry a spare recording medium, it is obvious that the ease-of-use of electronic cameras will be improved.

However, as a result of the increase in the number of image data items that can be recorded on a recording medium, the following problem has occurred.

An electronic camera has a display section to read and display recorded data. As the number of image data items that can be recorded on a recording medium increases, displaying recorded image data simply frame by frame in sequence will complicate the operation considerably and prolong the search time. Besides, displaying a large number of images will require the display section to be driven for an extended period of time, which in turn will result in waste of electric power.

BRIEF SUMMARY OF THE INVENTION

The present invention has been made in consideration of the above problem and its object is to provide an image display device such as an electronic camera that can search the recording medium for any desired image quickly even if there is a large number of image data items of photographed objects, that is easy to use and operate, and that can save electric power.

To achieve the above object, an image display device according to the first aspect of the present invention comprises loading means for loading, in the device body, a recording medium that stores image data of multiple photographed objects, instruction means for instructing image data recorded on the recording medium to be searched for, search means for searching for image data recorded on the recording medium under instructions from the instruction means, clock means for measuring the time during which the instruction means instructs the search means continuously to search for image data recorded on the recording medium, and search control means that adjusts the search range based on control parameters including the clock data of the clock means and recording capacity of the recording medium when the instruction means instructs the search means continuously to search for image data recorded on the recording medium.

The preferred embodiment of the image display device according to the present invention is as follows.

(1) If the loading means of recording media can hold a plurality of recording media, the control parameters further include the number of loaded recording media.

(2) The control parameters further include the number of image data items recorded on the recording media.

(3) The preferred embodiment comprises a reset means for resetting the time data of the clock means.

Besides, the image display device according to the present invention comprises loading means for loading, in the device body, recording media that store image data of multiple photographed objects, instruction means for instructing image data recorded on the recording media to be searched for, search means for searching for image data recorded on the recording media under instructions from the instruction means, and search range setting means that sets the search range for the search means to search for image data recorded on the recording media.

Furthermore, the image display device according to the present invention comprises loading means for loading, in the device body, recording media that store image data of multiple photographed objects; display means for displaying on screen the images corresponding to the image data recorded on the recording media; first display control means that has a function for enlarging an image to full screen and a function for displaying multiple images simultaneously by dividing the screen into multiple areas; second display control means that controls the display means so as to divide multiple image data items into multiple groups, to select one image data item from each of these groups, and to display the images corresponding to the selected image data on screen simultaneously or in sequence, if the number of the multiple image data items recorded on the recording media is larger than the number of images that can be displayed on the screen simultaneously; first selection means for selecting one of the images displayed on the screen by the display means under the control of the second display control means; third display control means that controls the display means so as to display, simultaneously or in sequence, the image selected by the first selection means and the images corresponding to the remaining image data of the group that contains the image data corresponding to the image selected by the first selection means; second selection means for selecting one of the multiple images displayed by the display means controlled by the third display control means; and third display control means that controls the display means to enlarge the image selected by the second selection means to full screen.

Also, the image display device according to the present invention comprises loading means for loading, in the device body, recording media that store image data of multiple photographed objects; display means for displaying on screen the images corresponding to the image data recorded on the recording media; first display control means that has a function for enlarging an image to full screen and a function for displaying multiple images simultaneously by dividing the screen into multiple areas; second display control means that controls the display means so as to divide multiple image data items into multiple groups, to select one image data item from each of these groups, and to display, on screen simultaneously or in sequence, the images corresponding to the selected image data items and marks indicating the existence of remaining image data in the respective groups to which the selected images belong, when the number of the multiple image data items recorded on the recording media is larger than the number of images that can be displayed on the screen simultaneously; selection means for selecting one of the images and marks displayed on the screen by the display means under the control of the second display control means; third display control means that controls the display means to enlarge the image to full screen when an image is selected by the selection means; and instruction means for instructing the remaining image data corresponding to the mark to be treated as multiple image data items recorded on the recording media if a mark is selected by the selection means and if the number of multiple image data items corresponding to the selected mark is larger than the number of images that can be displayed on the screen simultaneously.

According to the present invention, when, for example, the time during which the instruction means instructs the search means continuously to search for image data reaches a predetermined value, the search means increases the number of frames advanced at one time and extends the search range of the search means by judging, for example, that the image to be searched for is far ahead of or behind the current image.

Thus, any desired image can be searched for quickly even if there is a large number of image data items of photographed objects. If the recording capacity of the recording media is particularly large, increasing the frame-advance number and further extending the search range will make it possible to search for any desired image quickly.

Also, since the present invention comprises a search range setting means for setting the search range for searching for image data recorded on the recording media, it is possible to quickly search for images further ahead or behind by extending the search range. Thus, any desired image can be searched for quickly even if there is a large number of image data items of photographed objects.

Furthermore, according to the present invention, if the number of multiple image data items recorded on the recording media is larger than the number of images that can be displayed on screen simultaneously, the multiple image data items recorded on the recording media are divided into multiple groups, one image data item is selected from each of these groups, and the images corresponding to the selected image data are displayed on screen simultaneously or in sequence. If one of the images is selected, the images corresponding to the remaining image data of the group-that contains the image data corresponding to the selected image can be displayed simultaneously or in sequence. Then, if one of these multiple images displayed is selected, an enlarged view of the selected image is displayed on screen.

Consequently, if the number of image data items is too large to display the images corresponding to the image data recorded on the recording media, simultaneously on screen, the images can be grouped and organized into a layered structure. Then by selecting an image from each group and displaying the selected images on screen, it is possible to efficiently search on screen so many images that cannot be displayed on screen simultaneously.

Thus, any desired image can be searched for quickly even if there is a large number of image data items of photographed objects.

Also, according to the present invention, if the number of multiple image data items recorded on the recording media is larger than the number of images that can be displayed on screen simultaneously, the multiple image data items recorded on the recording media is divided into multiple groups, one image data item is selected from each of these groups, and the images corresponding to the selected image data are listed on the screen as representatives of respective groups while marks are displayed indicating the existence of remaining image data in the respective groups to which the selected images belong. Then, if the number of multiple image data items corresponding to any mark selected subsequently is larger than the number of images that can be displayed on the screen simultaneously, the images are grouped and organized into a layered structure that will similarly allow images and marks to displayed.

Consequently, even if the images corresponding to the image data recorded on the recording media cannot be displayed on the screen simultaneously, the image data can be viewed as images or marks and thus grasped visually. Therefore, any desired image can be searched for quickly even if there is a large number of image data items of photographed objects.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the embodiments of the present invention will be described with reference to the drawings.

First Embodiment

Figure 1:
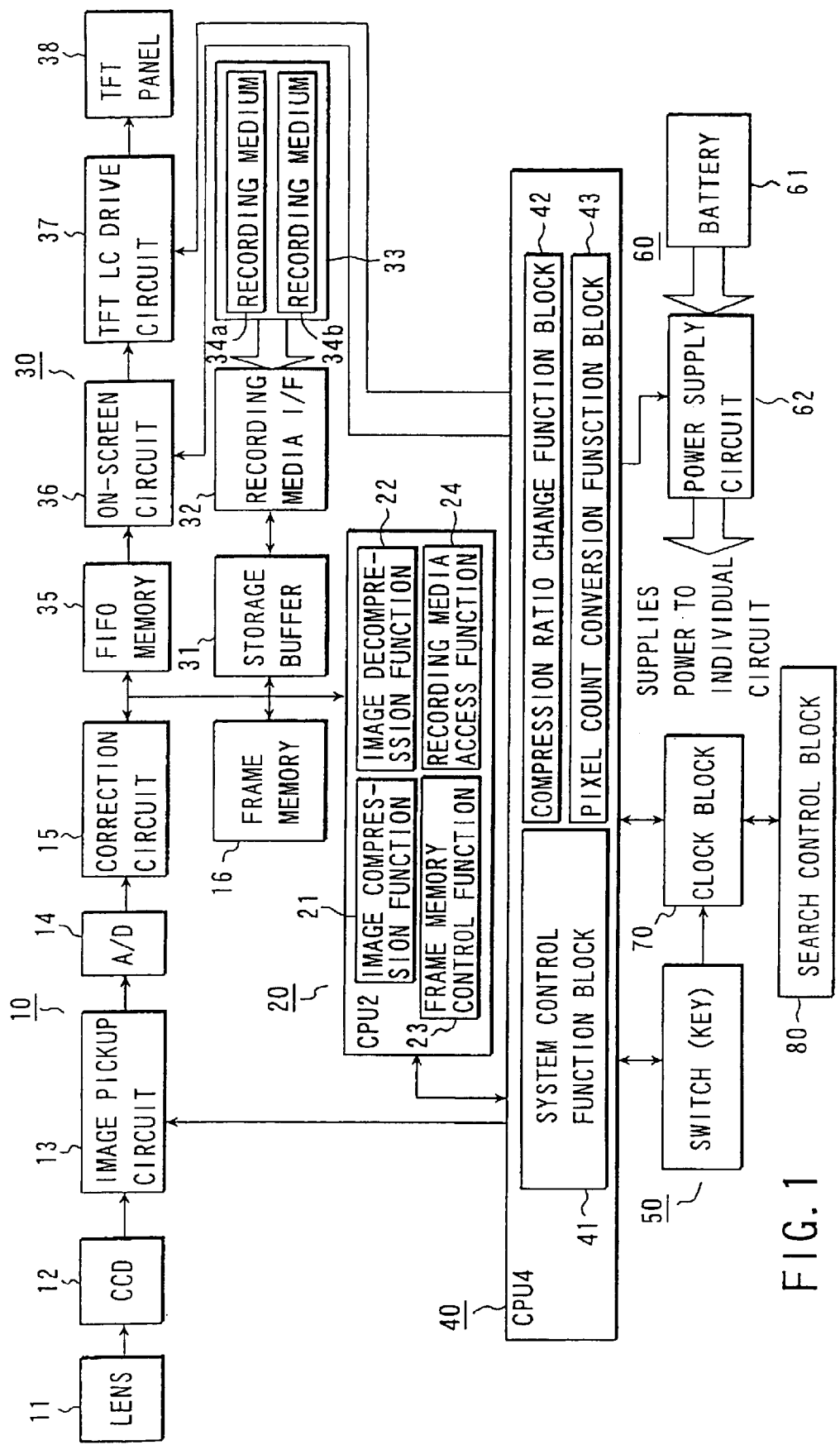
FIG. 1 is a block diagram illustrating the configuration of the electronic camera according to the first embodiment of the present invention.

FIG. 1 is a block diagram illustrating the configuration of the electronic camera according to the first embodiment of the present invention. This electronic camera generally includes an image pickup section 10, image data processing section 20, image data display section 30, control section 40, operation section 50 and power supply section 60.

The image pickup section 10 includes an image pickup lens 11, CCD image pickup element 12, image pickup circuit 13, A/D conversion circuit 14, correction circuit 15 for white balance correction, frame memory 16, etc. The image of an object captured through the optical system including the image pickup lens 11 is formed on the CCD image pickup element 12. Then the image signal of the formed image is converted into digital signals by the A/D conversion circuit 14, undergoes white balance correction by the correction circuit 15, and is recorded in the frame memory 16 as image data for one picture.

The image data processing section 20 includes a CPU 2 that comprises an image compression function section 21, image decompression or expansion function section 22, frame memory control function section 23, and recording media access function section 24; etc. The image data for one picture recorded in the frame memory 16 is compressed by the image compression function section 21 for still-image compression method such as JPEG and is then recorded in the storage buffer 31 in the image data display section. The compressed image data recorded in the storage buffer 31 is decompressed and sent to the FIFO memory 35 in the image data display section 30 and recorded on the recording media 43a and 34b contained in the recording media container section or loading section 33 of the image data display section 30.

The image data display section 30, which composes a display system, comprises a storage buffer 31, recording media I/F 32, recording media container section 33, display FIFO memory 35, on-screen circuit 36, TFT liquid crystal drive circuit 37, TFT panel (LCD) 38, etc. The image data recorded in the storage buffer 31 is read and recorded on the recording media 43a and 34b contained in the recording media container section 33. The image data selected under instructions from the operation section 50 from out of the image data recorded in the recording media container section 33 is sent to the display system to display an enlarged view of am image or display images simultaneously. The instructions from the operation section 50 is given to the image data display section 30 through the control section 40.

The image data sent to the display system is temporarily stored in the display FIFO memory 35. The image data read from the display FIFO memory 35 is converted into video signals by the on-screen circuit 36. At this time, character information such as a date and picture-taking conditions may be added. The video signals are supplied to the TFT panel 38 through the TFT liquid crystal drive circuit 37 and displayed as the image corresponding to the image data.

The control section 40, which comprises a system control function section 41, compression ratio change function section 42 for determining a data reduction mode and the like, and pixel count conversion function section 43, integrally controls the entire system, including the recording section 10, image data processing section 20, image data record and display section 30, etc.

The operation section 50, which is connected to the control section 40 and contains switches (keys) for camera operation switch inputs, makes the control section 40 perform required control actions by giving it operation signals.

Figure 2:
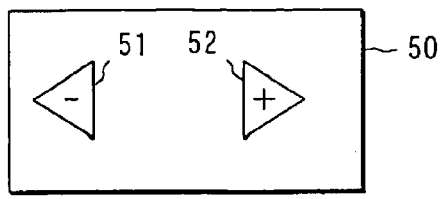
FIG. 2 is a view illustrating a concrete arrangement of the search keys.

Also, the operation section 50 has keys (search keys) for searching the images recorded on the recording media 43a and 34b for a desired image. FIG. 2 illustrates its concrete arrangement. Basically, each press of the minus key 51 selects the image one more image ahead of the current image and each press of the plus key selects the image one more image behind the current image.

The power supply section 60 uses a battery 61 as the main source of power and supplies necessary voltages to individual circuits through a power supply circuit 62.

The electronic camera according to this embodiments further comprises a clock section 70 for measuring the time during which the operation section 50 searches for image data continuously and a search control section 80 that variably controls the search range using the clock data of the clock section 70 and recording capacity of the recording media 34a and 34b as control parameters when the operation section 50 searches for image data continuously. Although the search control section 80 and control section 40 are provided separately here, it is also possible to incorporate the function of the search control section 80 into the control section 40. The number of the recording media cited here is not restrictive: in addition to 2, it can be either 1 or more than 2.

Figure 3:
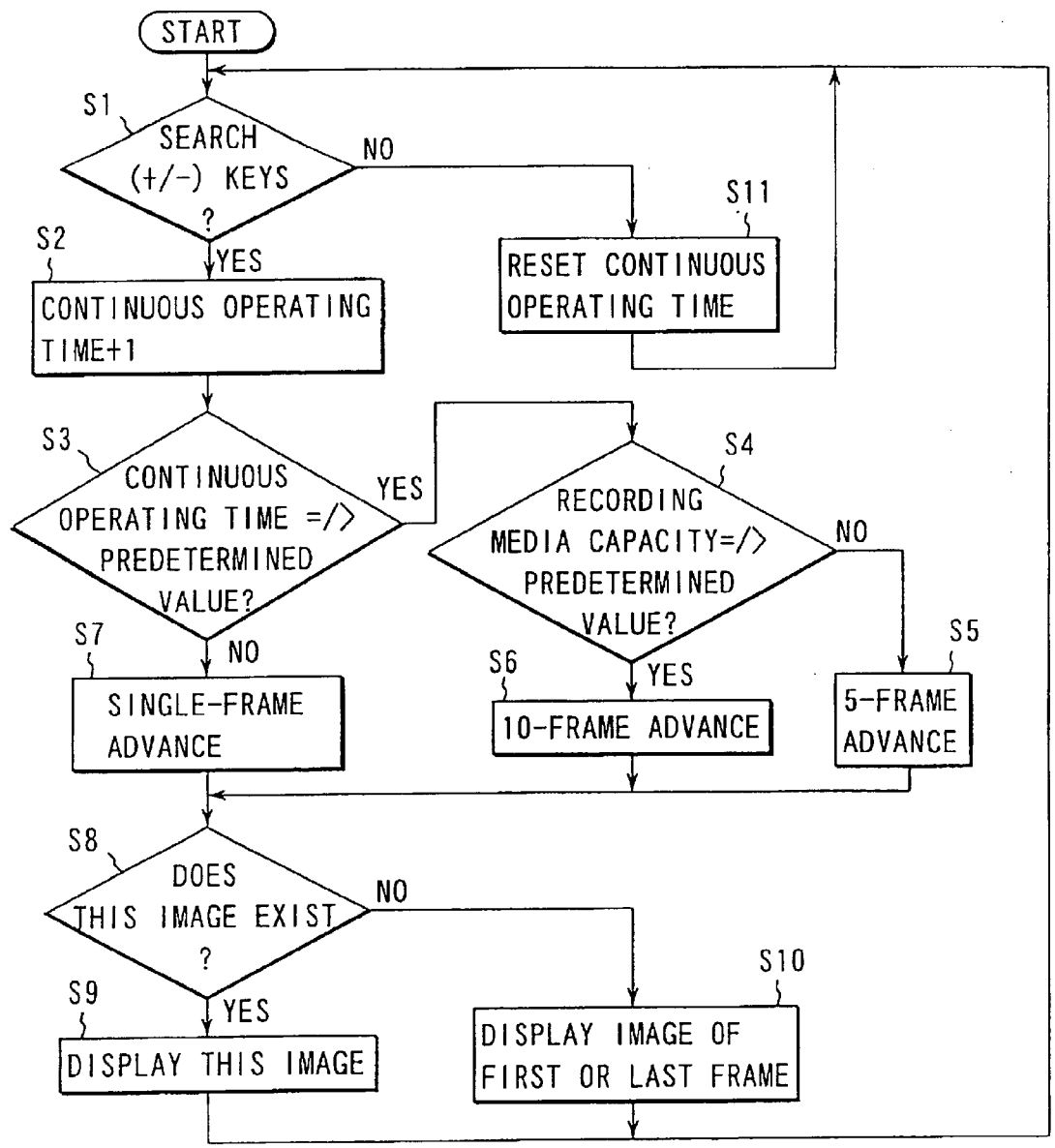
FIG. 3 is a flowchart illustrating the search method of the electronic camera of FIG. 1.

Since this embodiment comprises the clock section 70 and search control section 80; if, for example, the continuous operating time during which a search is performed by means of the search keys 50 and 51 reaches a predetermined value (Steps S1 to S3) as shown in the flowchart of FIG. 3, i.e., if the time during which instructions are given continuously by means of the search keys 50 and 51 to the search control section 80 to search for image data recorded on the recording media 43a and 34b reaches a predetermined value, the search control section judges, for example, that the image to be searched for is far ahead of or far behind the current image. Then, the search control section checks the storage capacity of the recording media 34a and 34b, and if it is large enough, the search control section increases the search range, i.e., the number of image frames advanced or backed with one press of a search key, for example, to 5 or 10 frames (Steps 4 and 5). Thus, any desired image can be searched for quickly even if there is a large number of picture frames of photographed objects.

If the storage capacity of the recording media 34a and 34b exceeds a certain value (Step 4), in particular, it is possible to search for a desired image more quickly by further increasing the search range.

On the other hand, if the time during which a search is performed by means of the search keys 50 and 51 is less than the predetermined value, a search is performed frame by frame as usual (Step 7).

Regardless of whether the time during which a search is performed by means of the search keys 50 and 51 reaches the predetermined value, if an appropriate image is found, an enlarged view of the image is displayed on the screen (Steps 8 and 9). If no appropriate image is found, the electronic camera displays the image of the first or last frame (Step S10) and returns to Step 1. If there is no search key 50 operation at Step S1, the data in the clock section 70 is reset automatically (Step 11).

Second Embodiment

Now, the electronic camera according to the second embodiment of the present invention will be described. Since the configuration of the camera according to this embodiment is basically the same as that of the first embodiment, the parts shown in FIG. 1 are omitted. Also, the parts which have corresponding parts in FIGS. 1 to 3 will be designated with the same reference numerals and their descriptions will be omitted.

Figure 4:
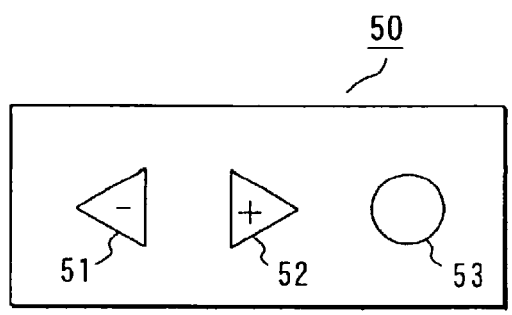
FIG. 4 is a view illustrating a concrete arrangement of the frame-advance specification buttons.

The electronic camera of this embodiment differs from that of the first embodiment in that a key (frame-advance specification key) 53 for specifying the search range (frame-advance count, i.e., number of skips) for the control section 40 to search for image data (images) recorded on the recording media 34a and 34b is provided in the operation section 50 together with the forward and backward search keys 51 and 52 as shown, for example, in FIG. 4.

Since this embodiment comprises the frame-advance specification key 53, any desired image can be searched for quickly by increasing the number of frames to be skipped even if there is a large number of image data items of photographed objects. In contrast, conventional methods, which can search only frame by frame, cannot search for a desired image quickly if there is a large number of image data items.

Needless to say that the electronic camera according to this embodiment is also capable of frame-by-frame advance. Therefore, it can search for any desired image reliably by setting the frame-advance count to 1 by means of the frame-advance specification key 53 when it becomes apparent that the desired image is getting closer.

Figure 5:
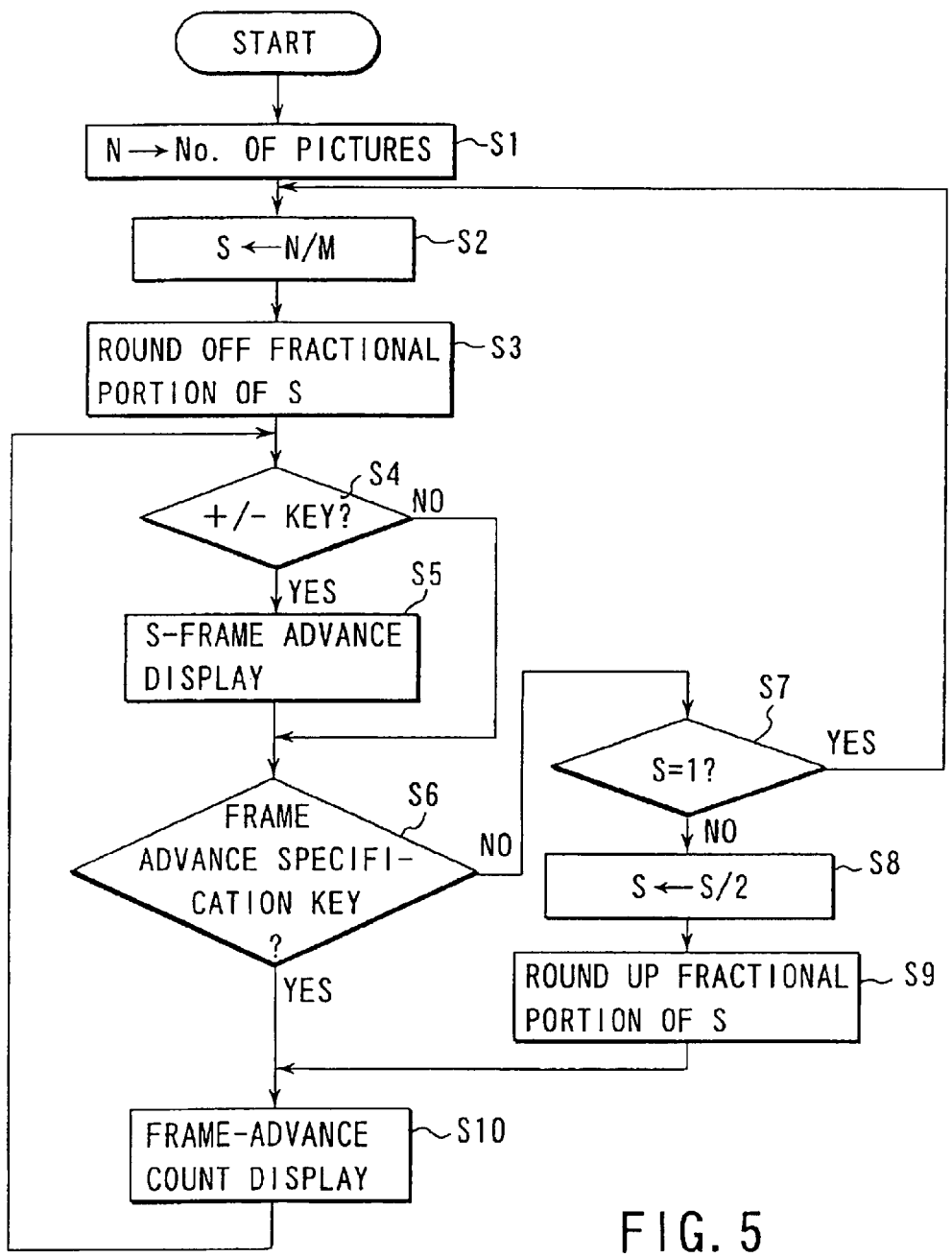
FIG. 5 is a flowchart illustrating the search method of the electronic camera of FIG. 4.

FIG. 5 is a flowchart illustrating a more specific search method. In the figure, N represents the number of pictures that can be taken while M (<N) represents the number of presses of the search keys (minus key 51 and plus key 52) required to search the entire search range.

It is assumed here that the number N of pictures that can be taken is larger than the number (for example 30) of presses of the search keys required to search the entire search range. By default, searches are conducted with a frame-advance of 2 or more frames. Basically, for example, the frame-advance count is halved (any fractional portion is rounded up) with each press of the frame-advance specification key 53 and returns to the default value when it reaches 1.

For example, if the default value of the frame-advance count is 10, the frame-advance count (number of skips) is set to 5 when the frame-advance specification key 53 is pressed once, and set to 3 (5/2=2.5) when the key is pressed again. It is set to 2 with the next press, and to 1 with another press. It returns to the default value of 10 with still another press.

Third Embodiment

Figure 6:
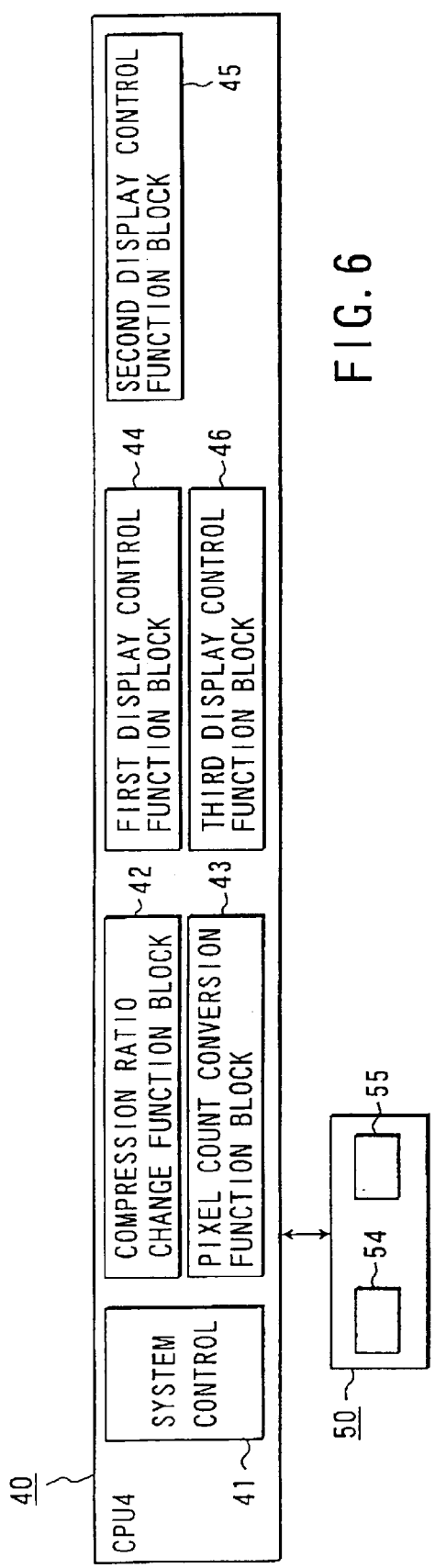
FIG. 6 is a schematic view illustrating the configuration of the electronic camera according to the third embodiment of the present invention.

FIG. 6 is a schematic view illustrating the characteristic parts of the electronic camera according to the third embodiment of the present invention. The configurations of the image pickup section 10, image data processing section 20, image data record and display section 30, and power supply section 60 are the same as those of the electronic camera according to the first embodiment. Therefore, reference numerals in the figure and their descriptions are omitted.

The electronic camera according to this embodiment differs in that the CPU 4 composing the control section 40 comprises a first display control function section 44, second display control function section 45, and third display control function section 46 and that the operation section 50 comprises a first selection key 54 and second selection key 55.

The first display control function section 44 controls the image data display section 30 so as to divide image data into multiple groups, to select one image data item from each of these groups, and to display the images corresponding to the selected image data on screen simultaneously or in sequence, if the number of the image data items recorded on the recording medium 33 is larger than the number of images that can be displayed on the screen simultaneously.

The first selection key 54 is used to select one image from the multiple images that belong to the one specified group displayed on the screen by the image data display section 30 under the control of the first display control function section 44.

The second display control function section 45 is installed in the control section 40. The image data display section 30 controls the image data so as to display, simultaneously or in sequence, the image selected by the first selection key 54 and the images corresponding to the remaining image data of the group that contains the image data corresponding to the image selected by the first selection key 54. If the number of files in the group is small enough, all the images are displayed on screen simultaneously. If the number of files in the group is too large for all the images to be displayed on screen simultaneously, the images are divided into several installments and each installment is displayed in batches one after another.

The second selection key 55 is used to select one of the multiple images displayed on screen by the image data display section 30 under the control of the second display control function section 45.

The third display control function section 46 is installed in the control section 40. It controls the image data display section 30 so as to display an enlarged view of the image selected by second selection key 55.

Since this embodiment comprises the first display control function section 44, first selection key 54, second display control function section 45, second selection key 55, and third display control function section 46, it can divide multiple image data items into multiple groups, select one image data item from each of these groups, and to display the images corresponding to the selected image data on screen simultaneously or in sequence, if the number of the multiple image data items recorded on the recording media is larger than the number of images that can be displayed on the screen simultaneously.

When one of the images is selected, the images corresponding to the remaining image data of the group that contains the image data corresponding to the selected image are displayed simultaneously or in sequence. Then, if one of these multiple images displayed is selected, an enlarged view of the selected image is displayed on screen.

Consequently, if the multiple images corresponding to the image data recorded on the recording media 34a and 34b cannot be displayed on screen simultaneously, the images can be grouped. If the images still cannot be displayed on screen simultaneously, they are further divided into groups and organized into a layered structure. This makes it possible to search efficiently on screen so many images that cannot be displayed on screen simultaneously. Thus, any desired image can be searched for quickly even if there is a large number of images of photographed objects.

Fourth Embodiment

Figure 7:
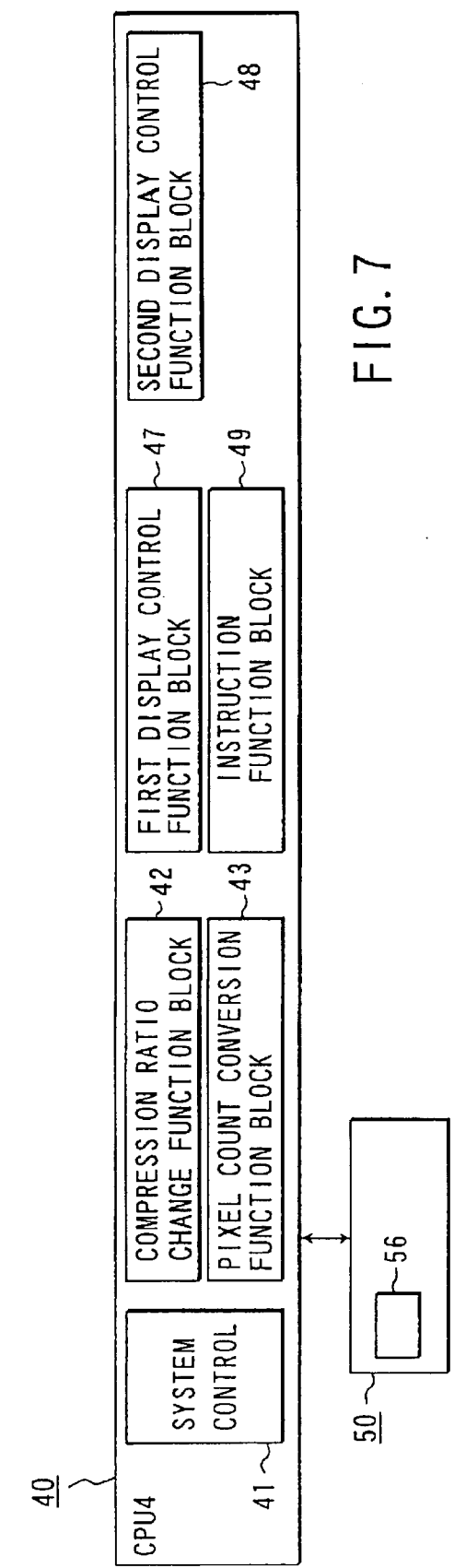
FIG. 7 is a schematic view illustrating the configuration of the electronic camera according to the fourth embodiment of the present invention.

FIG. 7 is a schematic view illustrating the major characteristic parts of the electronic camera according to the fourth embodiment of the present invention. The configurations of the image pickup section 10, image data processing section 20, image data record and display section 30, and power supply section 60 are the same as those of the electronic camera according to the first embodiment. Therefore, reference numerals in the figure and their descriptions are omitted.

The electronic camera according to this embodiment differs in that it further comprises a first display control function section 47, selection key 56, second display control function section 48, and instruction function section 49.

The first display control function section 47 controls the image data display section 30 so as to divide image data into multiple groups, to select one image data item from each of these groups, and to display, simultaneously or in sequence, the images corresponding to the selected image data items and marks (inter-frame indices) indicating the existence of remaining image data in the respective groups to which the selected images belong, if the number of the image data items recorded on the recording media 34a and 34b is larger than the number of images that can be displayed on the screen simultaneously.

Figure 8:
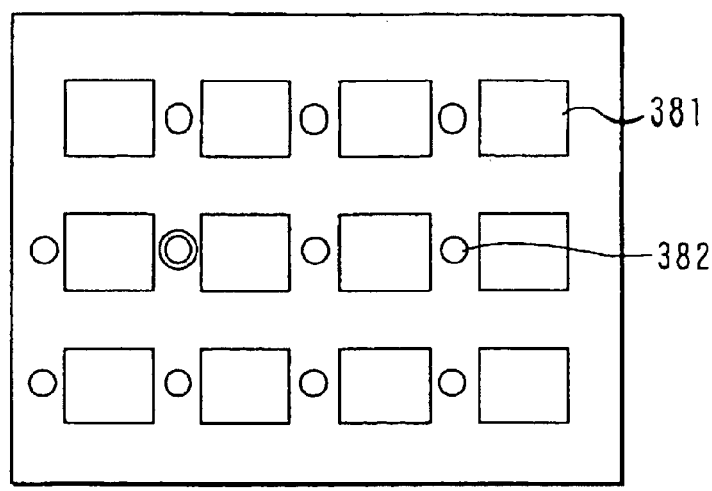
FIG. 8 is a view illustrating an example display method with indices between frames.
Figure 9:
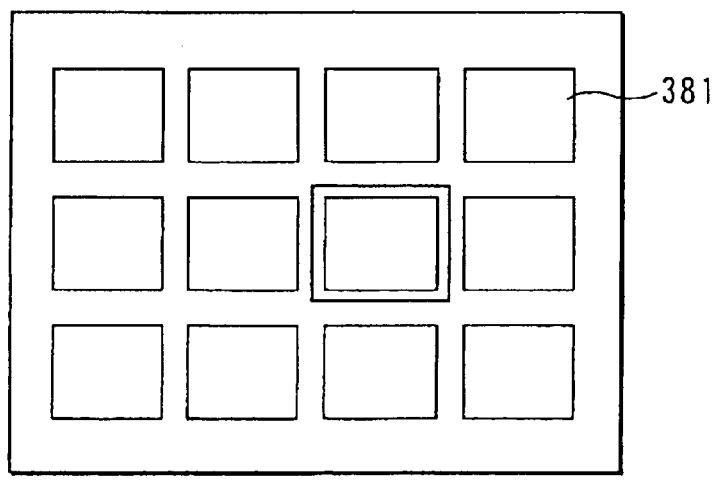
FIG. 9 is a view illustrating an example display method without indices between frames.

If the total number of image data items in the group is small enough, all the images are displayed on screen simultaneously. If the number of image data items in the group is too large for all the images to be displayed on screen simultaneously, the images are divided into several installments and each installment is displayed in batches one after another. FIG. 8 shows an example of how selected images and inter-frame indices (display with indices between frames) are displayed while FIG. 9 shows an example of how images without inter-frame indices (display without indices between frames) are displayed. In the figure, 381 shows a frame of an image and 382 shows an inter-frame index while the boxed image and double circle show a selected image and selected inter-frame index, respectively.

Figure 10:
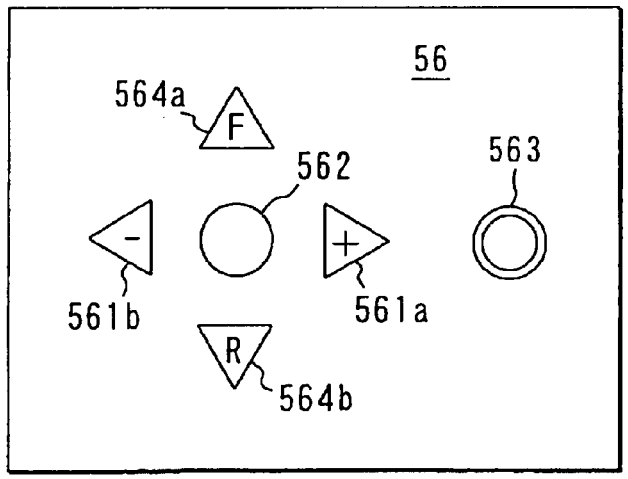
FIG. 10 is a view illustrating a concrete arrangement of the selection keys.

The selection key 56 is installed in the operation section 50. It is used to select one of the multiple images and inter-frame indices displayed on screen by the image data display section 30 under the control of the first display control function section 47. FIG. 10 shows concrete examples of the selection key 56. 561a and 561b are selection keys used to select one of the selected images or inter-frame indices displayed on the screen. 562 is a confirmation key for confirming a selected key, 563 is a full view key for full view display, and 564a and 564b are page keys for switching to the images and inter-frame indices on the previous and next pages of the image data recorded on the recording media 34a and 34b page by page, but not displayed on the screen currently.

The second display control function section 48 is used after an image is selected by the selection key 56. It controls the image data display section 30 so as to enlarge the image to full screen.

The instruction function section 49 is installed in the control section 40. If an inter-frame index is selected by the selection section 49 and if the number of multiple image data items corresponding to the selected inter-frame index is larger than the number of images that can be displayed on the screen simultaneously, the instruction function section 49 instructs the remaining image data corresponding to the selected mark to be treated as multiple image data items recorded on the recording media.

Since this embodiment comprises the first display control function section 47, selection key 56, second display control function section 48, and instruction function section 49; if the number of the image data items recorded on the recording media 34a and 34b is larger than the number of images that can be displayed on screen simultaneously, the image data recorded on the recording media is divided into multiple groups, one image data item is selected from each of these groups, and the images corresponding to the selected image data are listed on the screen as representatives of respective groups while inter-frame indices are displayed indicating the existence of remaining image data in the respective groups to which the selected images belong. Then, if the number of multiple image data items corresponding to any inter-frame index selected subsequently is larger than the number of images that can be displayed on the screen simultaneously, the images are grouped and organized into a layered structure that will similarly allow images and inter-frame indices to be displayed.

Consequently, even if the images corresponding to the image data recorded on the recording media 34a and 34b cannot be displayed on the screen simultaneously, the image data can be viewed as images or inter-frame indices and thus grasped visually. Therefore, any desired image can be searched for quickly even if there is a large number of image data items of photographed objects.

Figure 11:
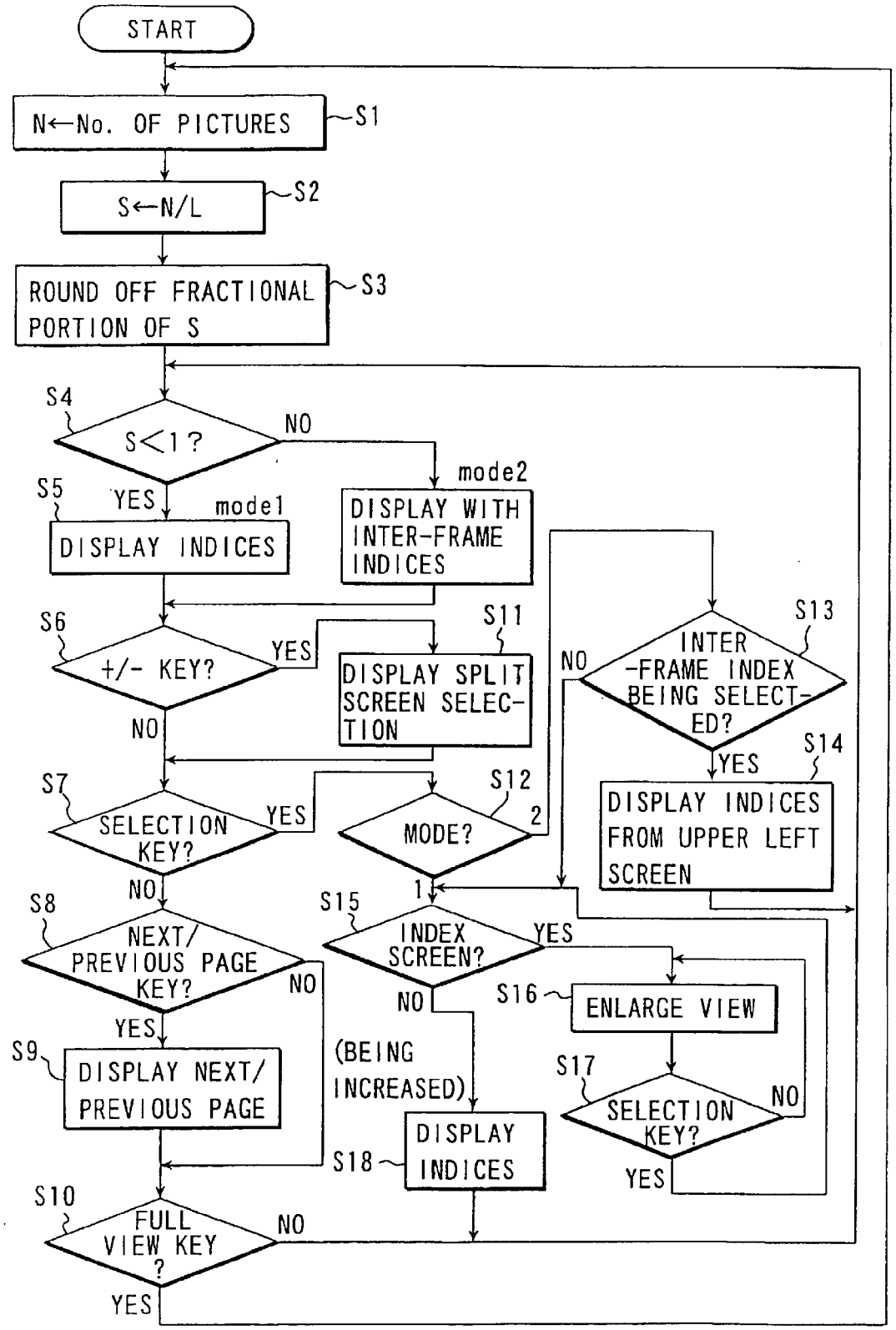
FIG. 11 is a flowchart illustrating the search method of the electronic camera of FIG. 7.

FIG. 11 is a flowchart illustrating a concrete search method. In the figure, N represents the number of pictures that can be taken while L (<N) represents the number (for example, 12) of images that can be displayed on the screen (LCD) simultaneously.

Steps S1 to S10 show a processing form that can do without inter-frame indices by providing multiple pages. In contrast, it is also possible to make do with only one page by using display with inter-frame indices.

On the other hand, the processing sequence in Steps S1 to S7 and S11 to S18 shows the processing when images are displayed with inter-frame indices. Steps S4 to S6, S11, S7, and S12 to S14 are repeated until no inter-frame index is displayed. Eventually, a search screen is selected in a display without inter-frame indices and an image is displayed in full screen.

The present invention is not limited to the embodiments described above. For example, although the embodiments have been described above in relation to external recording media, the present invention can also be applied to internal recording media. Besides, the present invention can be applied to electronic cameras that are capable of taking motion pictures. In that case, for example, MPEG capable of compressing motion pictures will be employed for the image compression function 21 in FIG. 1. This will make it possible to search a large number of images composing a motion picture for any desired image quickly. Besides, various modifications may be made without departing from the spirit of the present invention.

As described above in detail, the present invention makes it possible to implement electronic cameras that can search for any desired image quickly even if there is a large number of image data items of photographed objects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. An image display device comprising:

loading means for loading, in a device body, a plurality of recording media with different recording capacities for storing image data of multiple photographed objects, instruction means for instructing image data recorded on a selected recording medium to be searched for, search means for searching for image data recorded on said selected recording medium under instructions from said instruction means, clock means for measuring a time during which said instruction means instructs said search means continuously to search for image data recorded on said recording medium, and search control means that include means for checking a recording capacity of the selected recording medium of the loaded recording media to adjust the search range by the search means based on control parameters including the time obtained in said clock means and the recording capacity of said selected recording medium when said instruction means instructs said search means continuously to search for image data recorded on said recording medium and when the checked recording capacity is determined to be larger than a predetermined value.

2. An image display device according to claim 1, wherein said image display device is formed as an electronic camera.

3. An image display device as recited in claim 1, wherein said search means comprises skip means for skipping multiple image data items to enlarge the search range when the time in said clock means exceeds a predetermined value and when the recording capacity checked by the checking means exceeds a predetermined value.

4. An image display device as recited in claim 3, wherein said skip means comprises means for changing the number of skips variably in accordance with the recording capacity checked by the checking means.

5. An image display device as recited in claim 1, wherein said loading means holds a plurality of recording media and said control parameters include the number of said recording media loaded in said loading means.

6. An image display device as recited in claim 1, wherein said control parameters further include the number of image data items recorded on said recording media.

7. An image display device, as recited in claim 3, wherein the selected recording medium stores an ordered sequence of images including a first image, a second image, and at least one intervening image in the ordered sequence between the first image and the second image, and wherein skip means displays the second image in the ordered sequence immediately after the first image in the ordered sequence without displaying the at least one intervening image.

8. An image display device, as recited in claim 7, wherein the number of at least one intervening images is a function of the recording capacity checked by the checking means exceeding a predetermined value.

9. An image display device, as recited in claim 4, wherein the selected recording medium stores an ordered sequence of images including a first image, a second image, and at least one intervening image in the ordered sequence between the first image and the second image, and wherein skip means displays the second image in the ordered sequence immediately after the first image in the ordered sequence without displaying the at least one intervening image.

10. An image display device, as recited in claim 9, wherein the number of at least one intervening images is a function of the recording capacity checked by the checking means exceeding a predetermined value.

11. An image display device, as recited in claim 3, wherein the recording media stores an ordered sequence of images including a first image, a second image, and at least one intervening image in the ordered sequence between the first image and the second image and wherein skip means displays the second image in the ordered sequence immediately after the first image in the ordered sequence without displaying the at least one intervening image.

12. An image display device, as recited in claim 11, wherein the number of at least one intervening images is a function of the number of images in the ordered sequence.

13. An image display device, as recited in claim 3, wherein the recording media stores an ordered sequence of images including a first image, a second image, and at least one intervening image in the ordered sequence between the first image and the second image, and wherein skip means displays the second image in the ordered sequence immediately after the first image in the ordered sequence without displaying the at least one intervening image.

14. Am image display device, as recited in claim 13, wherein the number of at least one intervening images is a function of the number of images in the ordered sequence.

* * * * *